United States Patent
Bowser et al.

(10) Patent No.: US 10,075,427 B2
(45) Date of Patent: Sep. 11, 2018

(54) RESETTING AUTHENTICATION TOKENS BASED ON AN IMPLICIT CREDENTIAL IN RESPONSE TO AN AUTHENTICATION REQUEST MISSING AN AUTHENTICATION TOKEN

(71) Applicant: LENOVO (Singapore) PTE, LTD., New Tech Park (SG)

(72) Inventors: Robert A. Bowser, Cary, NC (US); Richard Wayne Cheston, Pittsboro, NC (US); Howard Locker, Cary, NC (US); Goran Hans Wibran, Cary, NC (US); Randall Scott Springfield, Chapel Hill, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 14/230,921

(22) Filed: Mar. 31, 2014

(65) Prior Publication Data
US 2015/0281218 A1    Oct. 1, 2015

(51) Int. Cl.
*H04L 29/06*    (2006.01)

(52) U.S. Cl.
CPC ...... *H04L 63/0823* (2013.01); *H04L 63/0846* (2013.01); *H04L 63/0861* (2013.01)

(58) Field of Classification Search
CPC ..... H04L 9/32–9/3297; H04L 63/04–63/0492; H04L 63/08–63/0892; H04L 63/0823; H04L 63/0861; H04L 63/0846; H04L 63/083; G06F 21/30–21/46; G06F 21/60–21/645; G06F 9/00
USPC ............... 726/1–10.7, 18; 713/155, 161, 170
See application file for complete search history.

(56) References Cited

U.S. PATENT DOCUMENTS

| | | | | |
|---|---|---|---|---|
| 9,313,172 | B1* | 4/2016 | Brandwine | ......... H04L 63/0236 |
| 2006/0020793 | A1* | 1/2006 | Rogers | ............... H04L 63/0807 713/168 |
| 2007/0250920 | A1* | 10/2007 | Lindsay | ................. G06F 21/31 726/7 |
| 2009/0036096 | A1* | 2/2009 | Ibrahim | ................ H04L 63/083 455/411 |
| 2014/0047536 | A1* | 2/2014 | Jung | ...................... G06F 21/31 726/16 |
| 2014/0096210 | A1* | 4/2014 | Dabbiere | .......................... 726/5 |
| 2014/0123228 | A1* | 5/2014 | Brill et al. | ........................ 726/4 |

* cited by examiner

*Primary Examiner* — Ashok Patel
*Assistant Examiner* — Quazi Farooqui
(74) *Attorney, Agent, or Firm* — Kunzler, PC

(57) ABSTRACT

For resetting authentication tokens based on implicit credentials, a method is disclosed that includes receiving, by use of a processor, an authentication request, the request requiring an authentication token, the request not including the authentication token, verifying an implicit credential, and resetting the authentication token in response to the implicit credential matching a predefined credential.

20 Claims, 8 Drawing Sheets

RESETTING AUTHENTICATION TOKENS BASED ON AN IMPLICIT CREDENTIAL IN RESPONSE TO AN AUTHENTICATION REQUEST MISSING AN AUTHENTICATION TOKEN

FIELD

The subject matter disclosed herein relates to computer authentication and more particularly relates to resetting authentication tokens based on implicit factors.

BACKGROUND

Description of the Related Art

Modern computing devices include various systems or method to authenticate a user of the computing device. These systems typically include some kind of authentication token, such as a password, pass-phrase or similar. Users frequently forget this authentication token and must request the authentication token to be reset.

Procedures to reset an authentication token may include disabling an associated account, and notifying an account administrator to reset the token. The user may then be challenged with a set of security questions to verify their identity. Successfully responding to the security questions may result in the user providing a new authentication token and the user may subsequently authenticate to the computing device using the new authentication token.

In another example, the user may be notified via email, SMS or other means with a link that may be used to reset the authentication token. The user must then login to his/her email, click the link, and follow instructions on an authentication server, or similar. These various reset procedures are inconvenient and require significant time for a user especially for some environments where available time is limited such as a classroom.

In one scenario, the need to reset tokens may be reduced through granting a group of users may be given a single authentication token, however, the user may still forget the authentication token. Alternately, an administrator may encourage non-secure practices to avoid the authentication process altogether.

BRIEF SUMMARY

An apparatus for resetting an authentication token based on implicit factors is disclosed. In one embodiment, the apparatus may include a processor and a memory that stores code executable by the processor. In another embodiment, the code may include code that receives an authentication request, the request requiring an authentication token, wherein the request does not include the authentication token. In a further embodiment, the code may verifies an implicit credential. In one embodiment, the code may reset the authentication token in response to the implicit credential matching a predefined credential. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
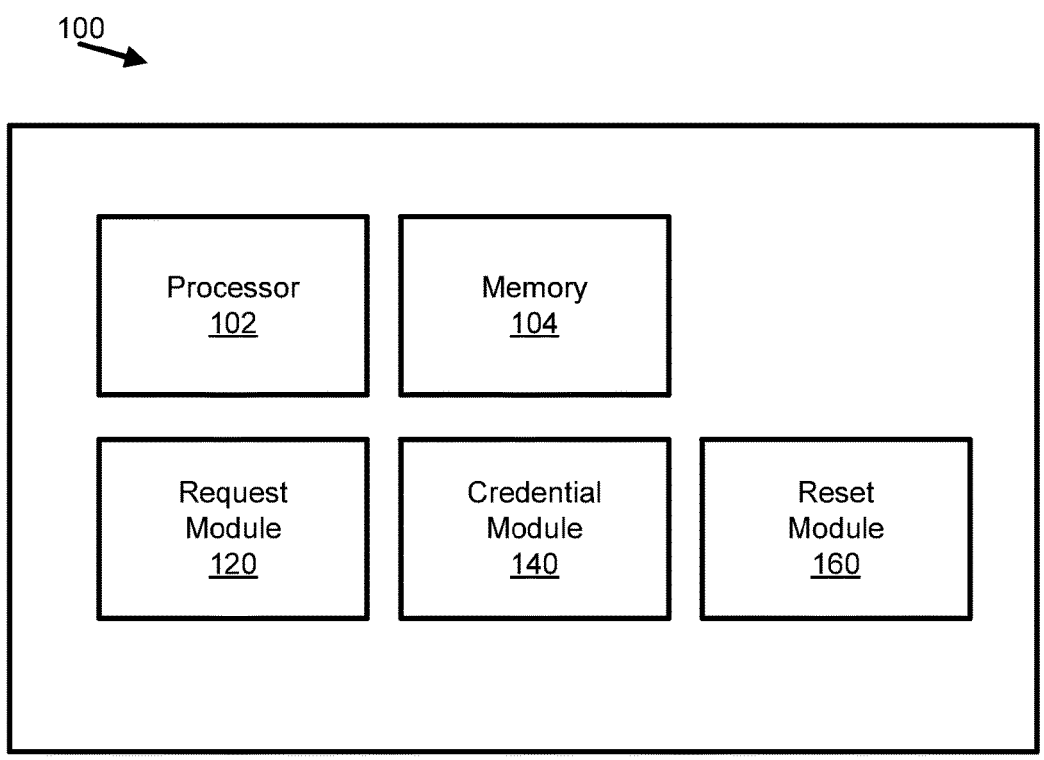
FIG. 1 is a schematic block diagram illustrating one embodiment of an apparatus for resetting an authentication token based on implicit credentials.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment of an apparatus 100 for resetting an authentication token based on implicit credential. In one embodiment, the apparatus 100 may include a processor 102, memory 104, a request module 120, a credential module 140, and a reset module 160.

In one embodiment, the processor 102 may include any microprocessor capable of executing executable code as one skilled in the art may appreciate. The processor 102 may implement any kind of instruction set, such as, but not limited to, a reduced instruction set, a complex instruction set, or the like. Therefore, this disclosure is not limited regarding the processor 102.

In one embodiment, the memory 104 may include any kind of memory capable of storing executable code. The memory 104 may include volatile memory, non-volatile memory, or the like. The memory 104 may include optical storage, electronic storage, physical storage, or other, or the like. Therefore, this disclosure is not limited regarding the memory 104.

In one embodiment, the apparatus 100 may include the request module 120. The request module 120, in one embodiment may include code that receives an authentication request, the request requiring an authentication token, the request not including the authentication token.

In one example, a user may have forgotten his/her password. The password may be required to authenticate to the apparatus 100. The user may submit an authentication request that includes a username associated with the user, but may leave the password field blank. Therefore, in certain examples, a user may submit an authentication request that does not include a required authentication token. In one example, the user may have forgotten the password. In another example, a keyboard for inputting the password may have a broken key such that the user cannot provide the required password.

In other examples, the authentication request may require an authentication token, wherein the authentication token is a fingerprint scan. In one example, a user may have injured a required finger and may not be able to provide the fingerprint scan. In another example, a fingerprint scanner may be broken such that the user cannot provide the fingerprint scan. Therefore, in one embodiment, the user may submit the authentication request without the required fingerprint scan.

In one embodiment, the request module 120 may receive the authentication request over a network and the request module 120 may determine an Internet protocol address. The implicit credential may be the Internet protocol address. In another embodiment, the request module 120 may determine a machine address code (MAC) based on the received authentication request and the implicit credential may be the MAC address of a network machine that transmitted the authentication request.

In another embodiment, the request module 120 may determine a time when the authentication request was received. In another embodiment, the authentication request may include a reset token. The reset token may include any text, or other, that may indicate a request to reset the authentication token. The reset token, in certain embodiments, may include a name. For example, the reset token may include a user's first name, last name, middle name, maiden name, or other, or the like. The reset token, in certain embodiments, may include an identification number. For example, the reset token may include a social security number, a student identification number, a credit card number, a class number, a pre-determined number, or any other number that may be used to identify the user.

In another embodiment, the reset token may include a location. For example, the reset token may include a town, city, county, state, country, continent, planet, building, school, business, island, river, body of water, mountain, elevation, latitude, longitude, or other, or the like. In another example, the location may include the location of the apparatus 100.

In another embodiment, the reset token may include a mascot. For example, where the apparatus 100 operates at a school, the reset token may include the name of the mascot, the type of the mascot, or other, or the like. This may make it easier for a user to remember.

In another embodiment, the reset token may include a cryptographic token. For example, the user may receive a cryptographic token from a cryptographic device and may provide the cryptographic token (as a reset token), in the authentication request. Therefore, in certain embodiments, a user may provide a reset token with the authentication request.

In one embodiment, the request module 120 may determine if the user has attempted to provide authentication token with the authentication request. In response to the authentication token being incorrect, the request module 120 may convert the authentication token to a reset token.

In certain embodiments, the request module 120 may receive the authentication request over a wired connection, a wireless connection, over a network, via a storage device, or other, or the like as one skilled in the art may appreciate.

In one embodiment, the apparatus 100 may include the credential module 140. The credential module 140 may include code that verifies an implicit credential. In one embodiment, the credential module 140 may determine the implicit credential. In one example, the implicit credential may be a time. A time, as described herein, may include, but is not limited to, a time of day, a second, a minute, an hour, a day of a month, a month of a year, a year, a decade, a score, a century, a millennium, any combination of the aforementioned times, or other, or the like and this disclosure is not limited in this regard.

In another embodiment, the credential module 140 may forward an authentication request to an authority. The credential module 140 may also include the implicit credential in a transmission to the authority. In one embodiment, the authority may be an authorized person. The authorized person may review the authentication request and an implicit credential, and may response to the credential module 140. Therefore, the credential module 140 may receive authorization from an authority to allow access. In another embodiment, the implicit credential may include the response from the authority. The response from the authority may be consistent with a pre-defined response and the reset module 160 may reset the authentication token for the user based on an affirmative response from the authority.

In another embodiment, the authority may respond automatically without user intervention. In one example, an implicit credential may be a time, and the authority may automatically verify the user based on the time being with a pre-determine range of time. For example, a student in a classroom, may transmit an authentication request without providing the authentication token, such as, but not limited to, a required password. The authority may verify an identification of the student because an implicit credential may include a time that may be within a timeframe of a current class.

In another embodiment, an implicit credential may be input from a sensor. For example, a sensor may include a fingerprint scanner. A user may transmit an authentication request and include a fingerprint scan. Although the authentication request may require an authentication token, the user may provide a fingerprint scan instead. Therefore, although the authentication token may be missing from the authentication request, an implicit credential may include input from the sensor, and the credential module 140 may verify the implicit credential.

In another example, a sensor may include a camera. A user may transmit an authentication request and include an image from a camera. Although the authentication request may require an authentication token, the request module 120 may forward the authentication request and the camera image (the implicit credential) to an authority. The authority may recognize the user in the camera image and verify the user. In another example, an authority may include facial recognition capability and may automatically verify the user based on the camera image of the user matching an authorized face.

In one embodiment, the apparatus 100 may include the reset module 160. In one embodiment, the reset module 160 may reset the authentication token in response to the implicit credential matching a predefined credential. In one embodiment, the implicit token may be a name, and the predefined credential may be the name. Therefore, because the implicit credential may match the predefined credential, the reset module 160 may reset the authentication token. The pre-defined credential may be similar to any of the aforementioned implicit credentials. The implicit credential may be an Internet protocol address, and the predefined credential may match. The implicit credential may be an identification number and the predefined credential may match. The implicit credential may be a location and the predefined credential may match. The implicit credential may be a mascot and the predefined credential may match. The implicit credential may be a cryptographic token and the predefined credential may match.

In another embodiment, the implicit credential and the predefined credential may not exactly match. Therefore, although the implicit credential may include capital letters and the predefined credential may include lower case letters, they may still match.

In another embodiment, the apparatus 100 may allow temporary access to a resource in response to the credential module 140 authenticating the user. The temporary access may allow a user to access resources while the authentication token is being reset. Therefore, although a user may have forgotten an authentication token, the user may still, in certain circumstances as described herein, access a resource. Therefore, a user may reset his/her authentication token, however, resetting the authentication token may not interrupt access to the resource.

In one embodiment, the temporary access may only be granted a threshold number of times. For example, the credential module 140 may grant temporary access based on the implicit credential matching a predefined credential as previously described. In one example, the credential module 140 may allow temporary access three times before a user may complete an authentication token reset procedure.

In another embodiment, the temporary access may only be granted for a threshold period of time. For example, the credential module 140 may allow temporary access for one hour before a user may be required to complete an authentication token reset procedure.

In one scenario, a student in a classroom enters his/her user identification, but may leave a password (the authentication token) blank. The request module 120 may determine a current time and compare the current time with a pre-defined time of classroom hours. In response to the current time matching a time of classroom hours, the credential module 140 may transmit the authentication request with the implicit token to the instructor (the authority). The instructor may authorize the user because the instructor may be able to visually identify the user. In another example, the authority may configure the apparatus to automatically allow access based on the current time being within a range of time, or another implicit credential as described herein.

In one embodiment, an implicit credential may not match a predefined credential. In response to the implicit credential not matching a predefined credential, the credential module 140 may reject the authentication request. The reset module 160 may also revert to more traditional resetting procedures, such as email based password recovery, and or challenging the user with one or more security questions.

Figure 2:
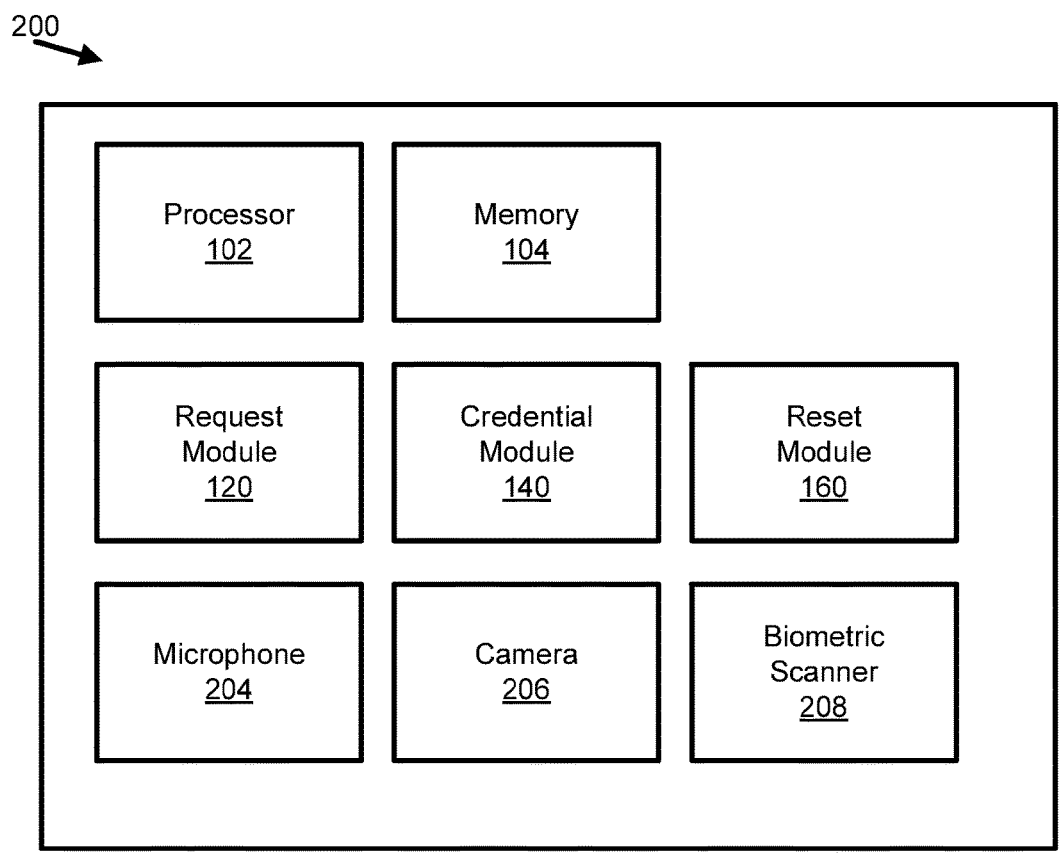
FIG. 2 is a schematic block diagram illustrating one embodiment of an apparatus for resetting an authentication token based on implicit credentials.

FIG. 2 is a schematic block diagram illustrating one embodiment of an apparatus 200 for resetting an authentication token based on implicit credentials. In one embodiment, the apparatus 200 includes the processor 102, the memory 104, the request module 120, the credential module 140, the reset module 160, a microphone 204, a camera 206, and a biometric scanner 208. The processor 102, the memory 104, the request module 120, the credential module 140, and the reset module 160 may or may not be substantially similar to those depicted in FIG. 1.

In one embodiment, the apparatus 200 includes the microphone 204. In one embodiment, the microphone 204 may receive an implicit credential from the user. In one example, the implicit credential may be a spoken key phrase by the user. In another embodiment, the microphone 204 may receive on or more words spoken by the user, and the request module 120 may determine an identity of the user based on voice recognition. Of course, one skilled in the art may appreciate a variety of different ways a user may be recognize using voice pattern, inflections, habits, accents, or the like.

Therefore, in one example, the user may forget his/her authentication token, and may speak a reset token. The microphone 204 may receive the reset token and include the reset token in an authentication request. The credential module 140 may verify the reset token, and the reset module 160 may reset the authentication token for the user.

In another embodiment, the apparatus 200 may include the camera 206. In one embodiment, the camera 206 may receive an implicit credential from the user. In one example, the implicit credential may be an image of the user. The request module 120 may receive the camera image with the authentication request. The credential module 140 may verify the camera image and verify the identity of the user. The reset module 160 may reset the authentication token based on the identity of the user matching a predefined identify.

In another embodiment, the apparatus 200 may include the biometric scanner 208. In one embodiment, the biometric scanner 208 may scan a user and the implicit credential may, at least in part, be the input from the biometric scanner 208. In one example, the biometric scanner 208 may scan a finger of the user. The request module 120 may receive the fingerprint scan with the authentication request. The fingerprint scan may be the implicit credential. The credential module 140 may verify that the fingerprint identifies a user. The reset module 160 may reset the authentication token for the user identified.

In another embodiment, the biometric scanner 208 may scan an eye of the user. The request module 120 may receive the eye scan with the authentication request. The eye scan may be the implicit credential. The credential module 140 may verify that the eye scan identifies the user. The reset module 160 may reset the authentication token for the user identified.

In one embodiment, the biometric scanner 208 may scan blood vessels in a hand of the user. The request module 120 may receive the scan with the authentication request. The scan may be the implicit credential. The credential module 140 may verify that the blood vessel scan identifies the user. The reset module 160 may reset the authentication token for the user identified.

Figure 3:
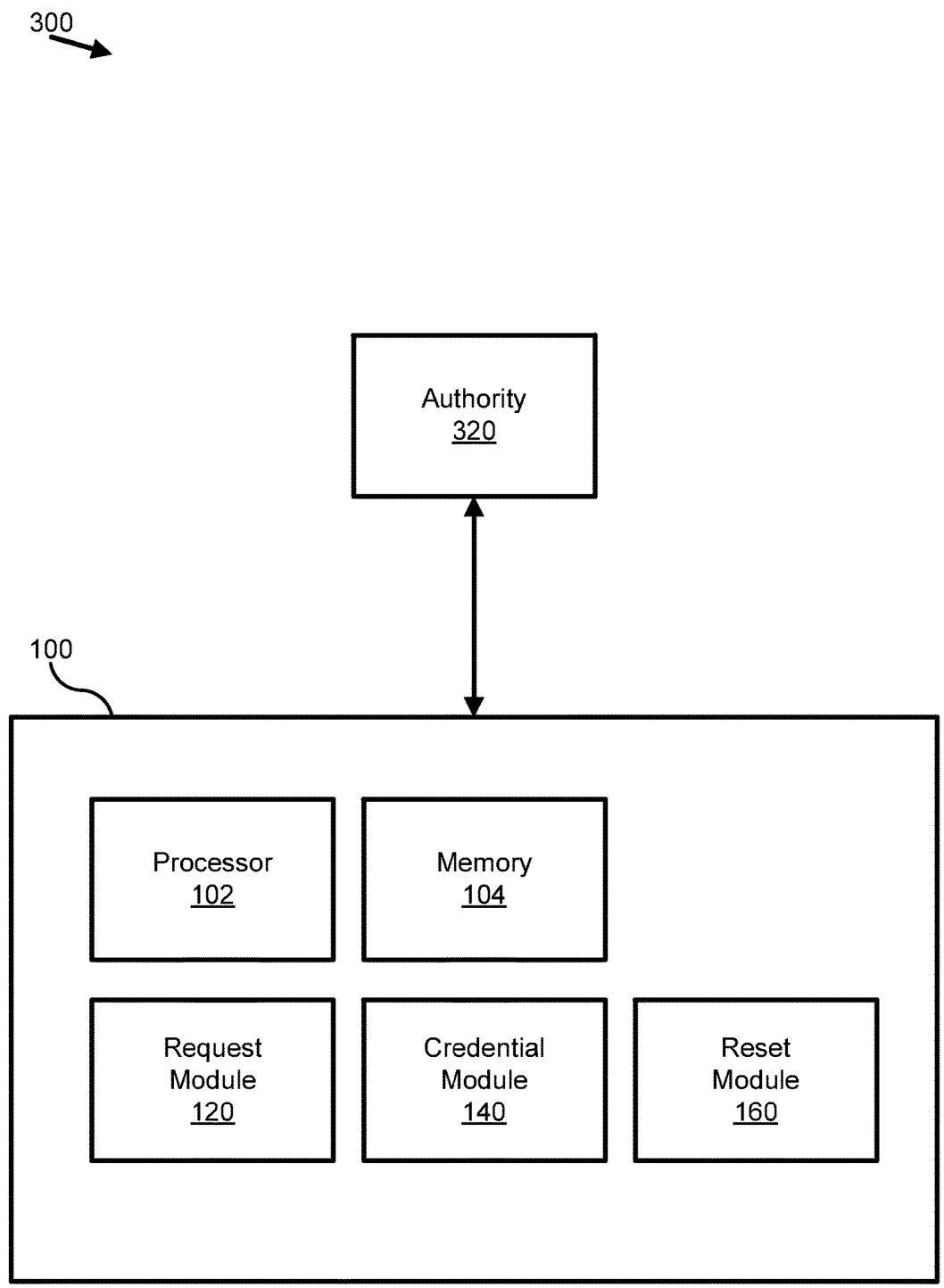
FIG. 3 is a schematic block diagram illustrating one embodiment of an apparatus for resetting an authentication token based on implicit credentials.

FIG. 3 is a schematic block diagram illustrating one embodiment 300 of an apparatus 100 for resetting an authentication token based on implicit credentials. In one embodiment, the apparatus 100 may include the processor 102, the memory 104, the request module 120, the credential module 140, and the reset module 160. The processor 102, the memory 104, the request module 120, the credential module 140, and the reset module 160 may or may not be substantially similar to those depicted in FIG. 1.

The apparatus 100 may communicate with an authority 320 as previously described. In one embodiment, the authority 320 may be an authoritative person. In one example, the request module 120 may receive an authentication request. The credential module 140 may forward the authentication request and an implicit credential to the authority 320. The authority 320 may verify the authentication request with the implicit credential, and the credential module 140 may verify the implicit credential based on a response from the authority 320.

In another embodiment, the authority 320 may be a computing device. In one example, the request module 120 may receive an authentication request. The credential module 140 may forward the authentication request and an implicit credential to the authority 320. The authority 320 may automatically verify the authentication request with the implicit credential, and the credential module 140 may verify the implicit credential based on a response from the authority 320. In another embodiment, an authoritative user may configure the authority 320 to automatically verify the implicit credential in response to the implicit credential matching a predefined credential as previously described. For example, the authoritative user may configure the authority 320 to automatically verify a predetermine user. In another example, the authoritative user may configure the authority 320 to automatically verify any user with an appropriate implicit credential.

Figure 4:
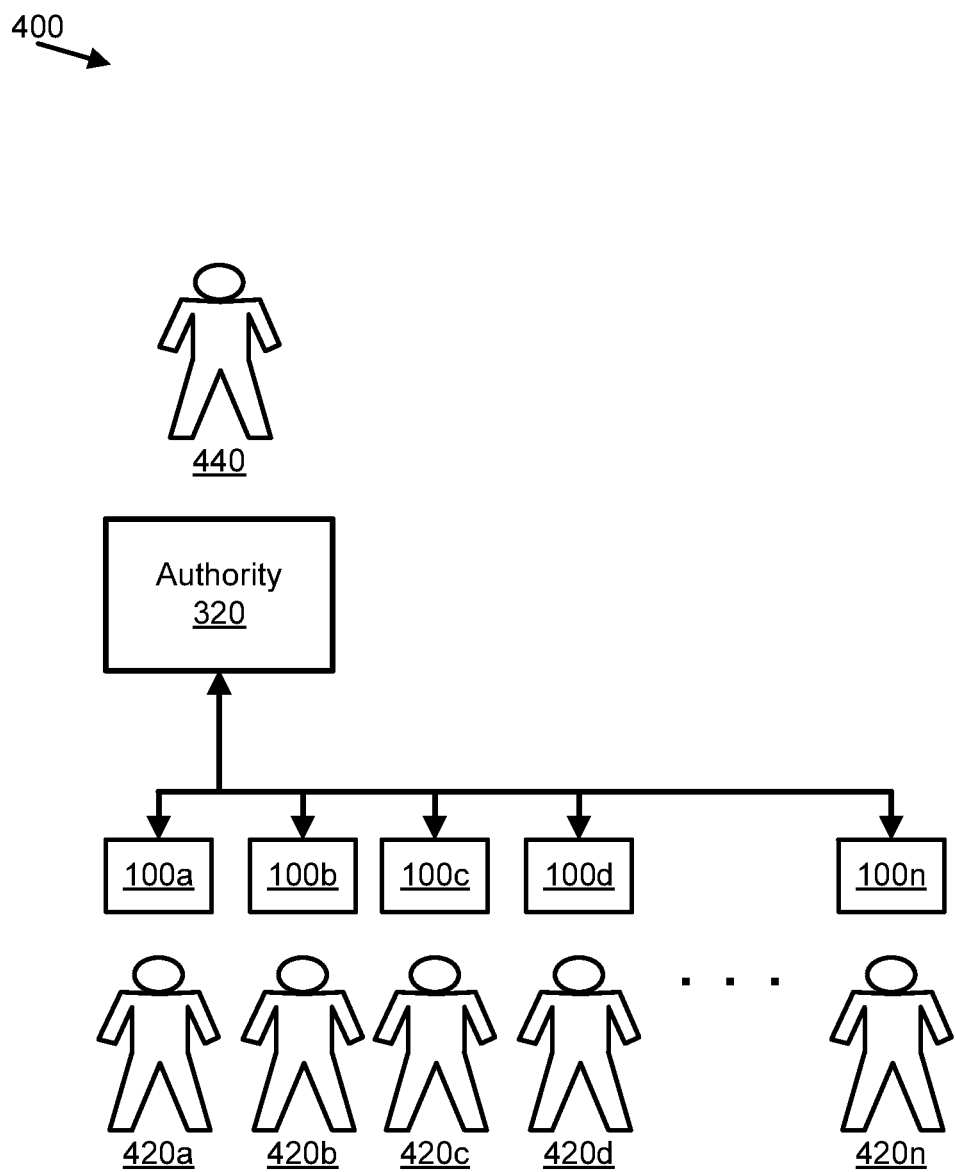
FIG. 4 is a schematic block diagram illustrating one embodiment of a system for resetting an authentication token based on implicit credentials.

FIG. 4 is a schematic block diagram illustrating one embodiment of a system 400 for resetting an authentication token based on implicit credentials. In one embodiment, the system may include an authority 320, and a plurality of apparatuses 100 as previously described. An authoritative user 440 may operate the authority 320. Of course, in this embodiment, the authority 320 may be a computing device. Respective users 420 may operate the apparatuses 100a, 100b, 100c, 100d, 100n. Of course, 100n may represent any number. Therefore, in one example the apparatus 100n may represent the fifth apparatus. In another example, the apparatus 100n may represent the 100$^{th}$ apparatus.

In one example, the scenario depicted in FIG. 4 may represent an educational scenario. The authoritative user 440 may be a teacher or instructor. The users 420 may represent students. In this example, the educational session may begin, however, one or more students 420 may have forgotten their respective authentication tokens.

For example, user 420a may submit an authentication request that does not include a required authentication token. The implicit token may be a current time. The credential module 140 may verify the implicit token based on a current time being within a time range for the educational scenario. The reset module 160 may reset the authentication token for the user 420a based on the implicit credential (time) matching a predetermined credential (time for the educational scenario).

In another example, user 420b may submit an authentication request that does not include a required authentication token. The implicit token may include an Internet protocol address of apparatus 100b. The credential module 140 may verify the implicit token based on the Internet protocol address associated with the authentication request matching a recognized Internet protocol address of the apparatus 100b. The reset module 160 may reset the authentication token for the user 420b based on the Internet protocol address matching the predefined Internet protocol address (a known Internet protocol address for the apparatus 100b).

In another example, user 420c may submit an authentication request that does not include a required authentication token. The request module 120 may forward the authentication request to the authority 320. The authority 320 may display the authentication request to the instructor 440. The instructor 440 may affirm the authentication via an interface at the authority 320 because the instructor 440 may recognize the user 420c. The authority 320 may transmit an approval to the credential module 140. The credential module 140 may verify the affirmation (the implicit credential) from the authority 320. The reset module 160 may reset the authentication token of user 420c in response to the implicit credential (the authentication from the authority 320).

In certain examples, the users 420a, 420b, 420c may reset respective authentication tokens without disrupting the educational scenario. Resetting authentication tokens for various users 420 may not require effort from the instructor 440. In other embodiments, respective credential modules 140 may allow temporary access in response to the respective users providing implicit credentials that match predefine credentials. Of course, in other examples, respective users 420 may authenticate by providing correct authentication tokens as one skilled in the art may appreciate.

Figure 5:
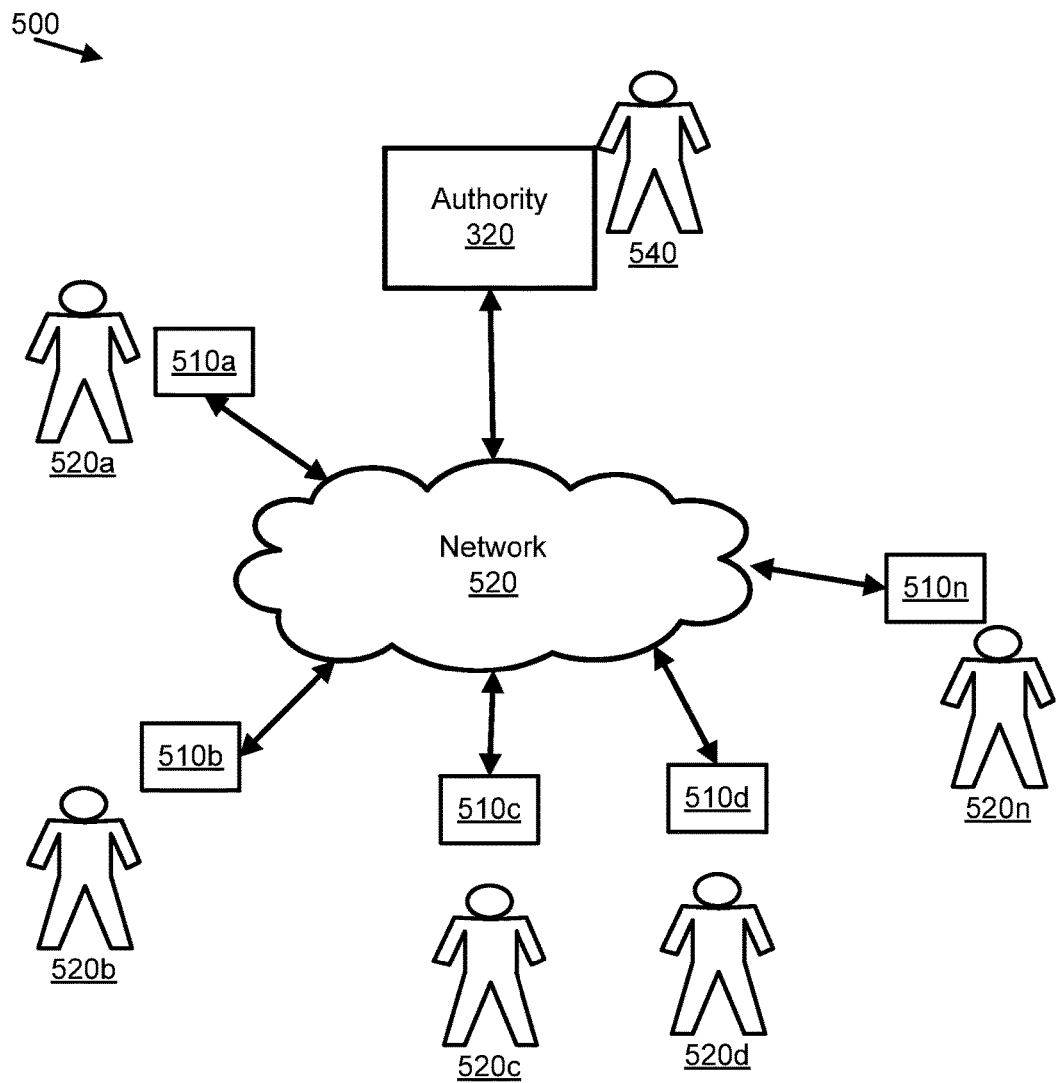
FIG. 5 is a schematic block diagram illustrating one embodiment of a system for resetting an authentication token based on implicit credentials.

FIG. 5 is a schematic block diagram illustrating one embodiment of a system for resetting an authentication token based on implicit credentials. In one embodiment, the system may include a plurality of apparatuses 510a, 510b, 510c, 510d, 510n, and the authority 320. The apparatuses 500 and the authority may communicate over a network 520.

Of course, the network may include any kind of network, such as, but not limited to, a local area network, a wide area network, a wired network, a wireless network, the Internet, or other, or the like and this disclosure is not limited in this regard. In one example, apparatus 510*a* and 510*b* may communicate via a local area network while apparatus 510*c* may communicate more remotely, such as, over the Internet.

In one embodiment, the user 520*a* may submit an authentication request that includes the required authentication token. The request module 120 may store an Internet protocol address for the apparatus 510*a*. Therefore, the request module 120 may learn the predefined credential (the learned Internet protocol address).

In one example, the user 520*a* may subsequently submit an authentication request that does not include a required authentication token. The implicit token may include an Internet protocol address of apparatus 510*a*. The credential module 140 may verify the implicit token based on the Internet protocol address associated with the authentication request matching the stored Internet protocol address of the apparatus 510*b*. The reset module 160 may reset the authentication token for the user 520*a* based on the Internet protocol address matching the predefined Internet protocol address (a known Internet protocol address for the apparatus 510*b*).

In one example, the user 520*b* may submit an authentication request that does not include a required authentication token. The implicit token may include a camera image of the user 520*b*. The credential module 140 may forward the authentication request with the camera image of the user 520*b* to the authority 320. The authoritative figure 540 may provide an affirmative response to the authority 320 because the authoritative figure 540 may recognize the user 520*b* in the camera image. The credential module 140 may verify the implicit token based on the Internet protocol address associated with the authentication request matching the stored Internet protocol address of the apparatus 510*b*. The reset module 160 may reset the authentication token for the user 520*a* based on the Internet protocol address matching the predefined Internet protocol address (a known Internet protocol address for the apparatus 510*b*).

Figure 6:
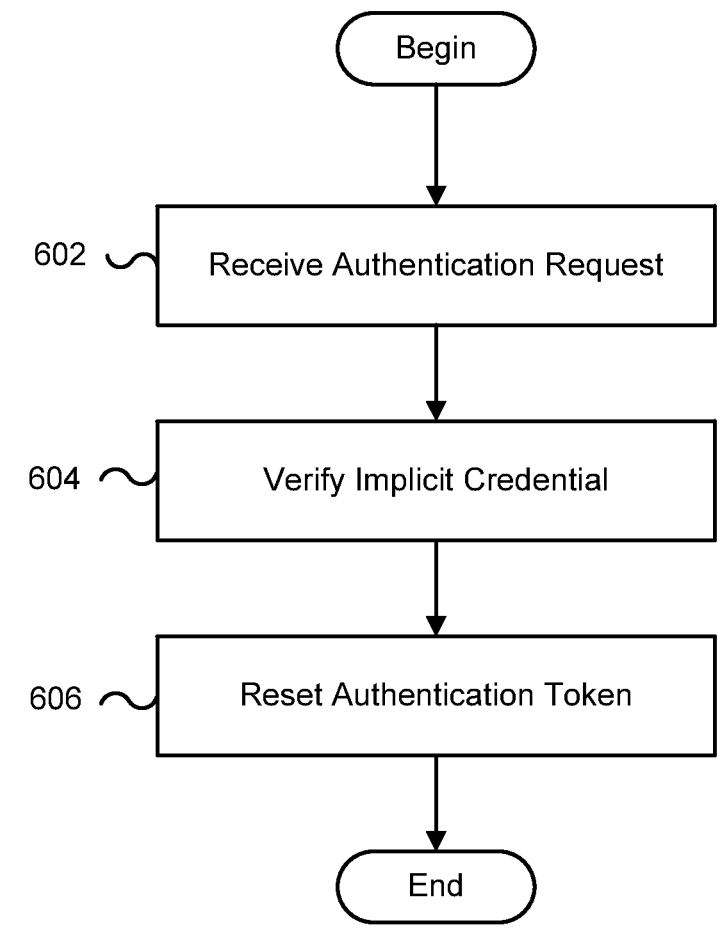
FIG. 6 is a schematic flow chart diagram illustrating one embodiment of a method for resetting an authentication token based on implicit credentials.

FIG. 6 is a schematic flow chart diagram illustrating one embodiment of a method 600 for resetting an authentication token based on implicit credentials. In one embodiment, the method 600 may begin and the request module 120 may receive 602 an authentication request. The authentication request may not include an authentication token although the authentication token may be required for access. The credential module 140 may verify 604 an implicit credential. The reset module 160 may reset 606 the authentication token in response to the implicit credential matching a predefined credential and the method 600 may end.

In another embodiment of the method 600, the implicit credential may be an authentication time, a machine address code, an Internet protocol address, a reset token, a response from an authority, and/or sensor input as previously described regarding the apparatus 200. In one embodiment of the method 600, the sensor may be a microphone 204, a biometric scanner 208, and/or a camera 206. In another embodiment, the reset token may be an identifying name, an identification number, a location, and/or a cryptographic token as previously described.

Figure 7:
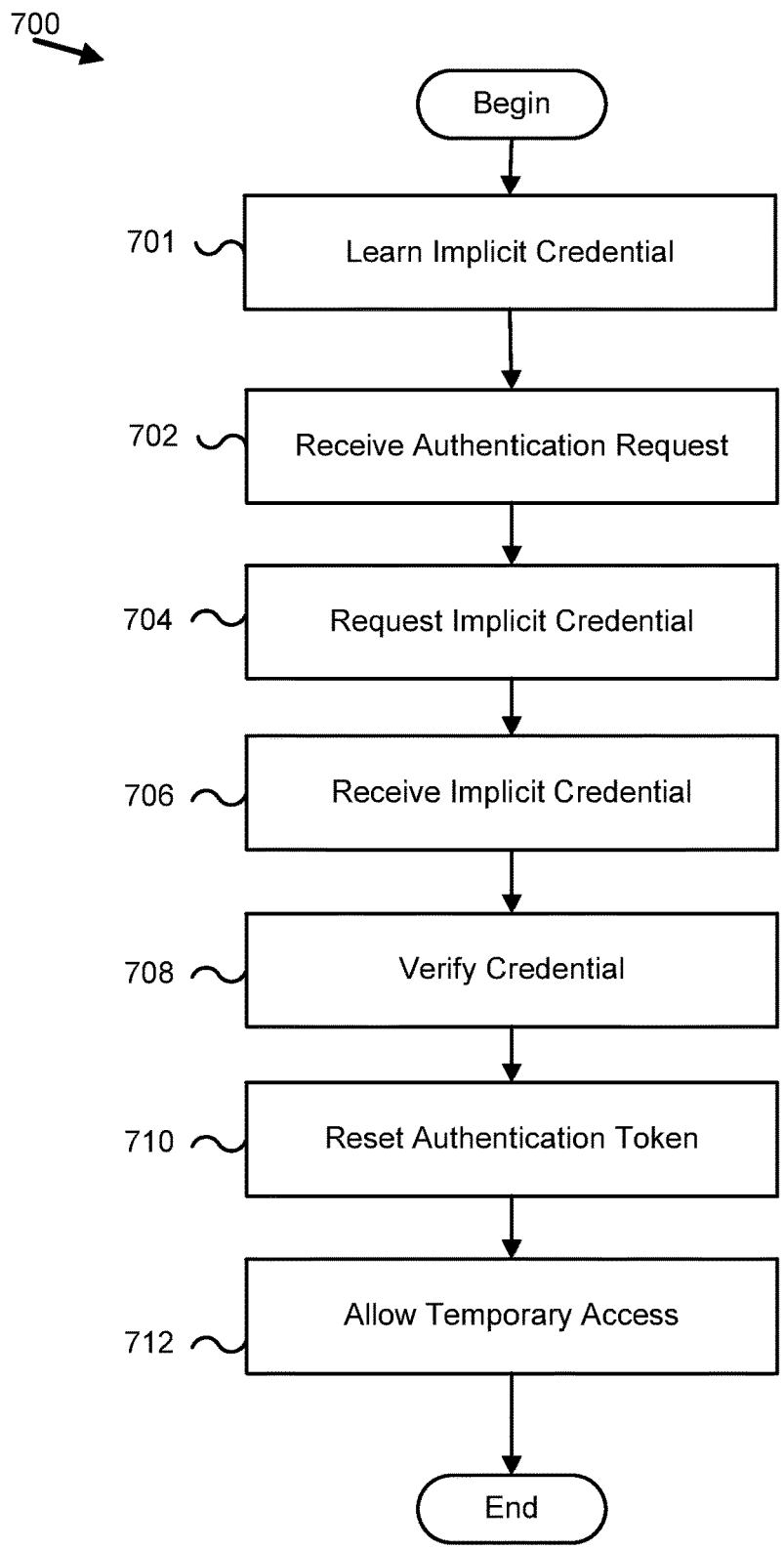
FIG. 7 is a schematic flow chart diagram illustrating one embodiment of a method for resetting an authentication token based on implicit credentials.

FIG. 7 is a schematic flow chart diagram illustrating one embodiment of a method 700 for resetting an authentication token based on implicit credentials. In one embodiment, the method 700 may begin and the request module 120 may learn 701 an implicit credential. The request module 120 may receive 702 an authentication request that does not include a required authentication token. The credential module 140 may request 704 an implicit credential. The credential module 140 may receive 706 the implicit credential. The credential module 140 may verify 708 the implicit credential. The reset module 160 may reset 710 the authentication token in response to the implicit credential matching the learned credential. The credential module 140 may allow temporary access based on the matched implicit credential and the method 700 may end.

In certain embodiments of the method 700, the request module 120 may transmit the authentication request to the authority and receive a response from the authority. The predefined credential matches the response from the authority. Therefore, the reset module 160 may reset the authentication token because the response from the authority (the implicit credential) may match a predefined credential (an affirmative response from an authority). In another embodiment, the reset module 160 may allow temporary access in response to the implicit token matching the predefined credential.

In another embodiment, the temporary access may be limited to a threshold value. For example, the reset module 160 may allow access up to three times before denying access, even in response to the implicit credential matching the predefined credential. In another example, the reset module 160 may allow access for up to one hour before denying access, even in response to the implicit credential matching the predefined credential.

Figure 8:
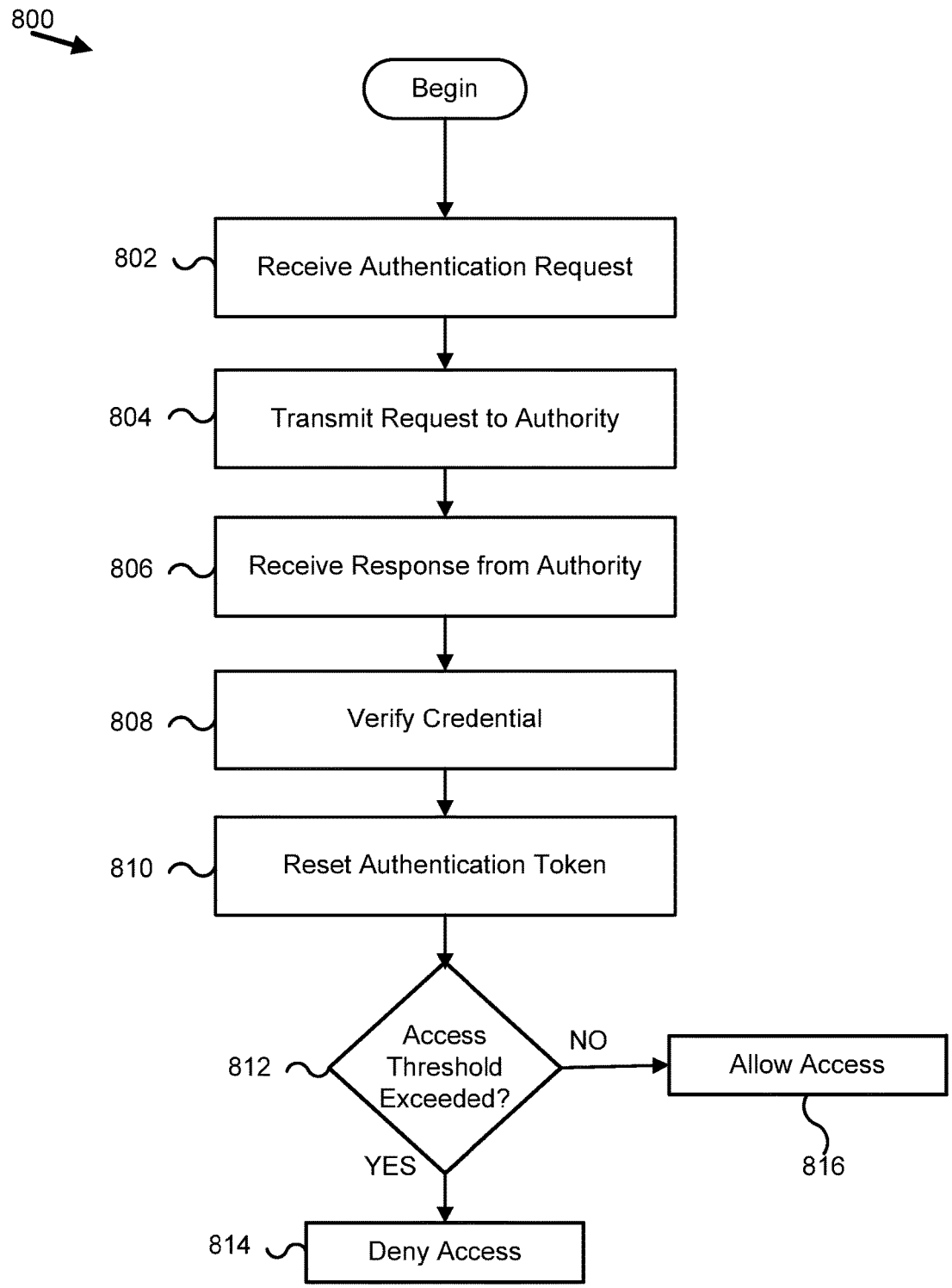
FIG. 8 is a schematic flow chart diagram illustrating one embodiment of a method for resetting an authentication token based on implicit credentials.

FIG. 8 is a schematic flow chart diagram illustrating one embodiment of a method 800 for resetting an authentication token based on implicit credentials. In one embodiment, the method 800 may begin and a request module 120 may receive 802 an authentication request, wherein the request does not include a required authentication token. The request module 120 may transmit 804 the request to the authority 320. The credential module 140 may receive 806 a response from the authority 320. The credential module 140 may verify 808 the response (the implicit credential) from the authority 320. The reset module 160 may reset 810 the authentication token for the user.

Although the reset module 160 may reset the authentication token, the user may not use the new authentication token. Therefore, based on a subsequent authentication request that still does not include the required authentication token, the request module 120 may increment a count of allowing access without the authentication token. If the access count does not exceed 812 a threshold count, the request module 120 may allow 816 access. If the access count does exceed 812 the threshold count, the request module 120 may deny 814 temporary access.

In another embodiment, in response to the request module 120 granting temporary access, the request module 120 may begin a timer. Based on a subsequent authentication request that still does not include the required authentication token, the request module 120 may determine 812 if an amount of time of temporary access exceeds a threshold amount of time. If the access time does not exceed 812 the threshold time, the request module 120 may allow 816 access. If the access time does exceed 812 the threshold time, the request module 120 may deny 814 temporary access.

The wireless connection may be a mobile telephone network. The wireless connection may also employ a Wi-Fi network based on any one of the Institute of Electrical and Electronics Engineers (IEEE) 802.11 standards. Alternatively, the wireless connection may be a BLUETOOTH® connection. In addition the wireless connection may employ a Radio Frequency Identification (RFID) communication including RFID standards established by the International Organization for Standardization (ISO), the International Electrotechnical Commission (IEC), the American Society for Testing and Materials (ASTM), the DASH7 Alliance, and EPCGlobal.

Alternatively, the wireless connection may employ a ZigBee connection based on the IEEE 802 standard. In one embodiment, the wireless connection employs a Z-Wave connection as designed by Sigma Designs. Alternatively, the wireless connection may employ an ANT and/or ANT+ connection as defined by Dynastream Innovations Inc. of Cochrane, Canada.

The wireless connection may be an infrared connection including connections conforming at least to the Infrared Physical Layer Specification (IrPHY) as defined by the Infrared Data Association (IrDA). Alternatively, the wireless connection may be a cellular telephone network communication. All standards and/or connection types include the latest version and revision of the standard and/or connection type as of the filing date of this application.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor;
a memory that stores code executable by the processor to:
receive an authentication request from a user, the authentication request usable to authenticate the user, wherein the authentication request requires an authentication token to authorize the user's access of a computing resource;
determine whether the authentication token is missing from the authentication request;
authenticate the user via the authentication request and the authentication token, in response to determining that the authentication token is not missing from the authentication request;
request an implicit credential in response to determining that the authentication token is missing from the authentication request, the user submitting the authentication request without any authentication token, the implicit credential being a different type of credential than the authentication token;
receive the implicit credential;
identify a time of day and date when the authentication request was received;
identify a network address of a device that transmitted the authentication request, wherein the network address is one of an IP address and a MAC address;
request an implicit credential in response to the user submitting the authentication request without any authentication token, the implicit credential being a different type of credential than the authentication token;
receive the implicit credential;
determine whether the time of day and date when the authentication request was received matches a predetermined time range in response to determining that the authentication token is missing from the authentication request;
determine whether the network address of the device that transmitted the authentication request matches a predefined network address in response to determining that the authentication token is missing from the authentication request;
determine whether the implicit credential matches a predefined credential in response to determining that the authentication token is missing from the authentication request; and
reset the authentication token in response to the time of day and date when the authentication request was received matching the predetermined time range, the network address of the device matching the predefined network address, and the implicit credential matching the predefined credential.

2. The apparatus of claim 1, wherein the authentication token is one of a password and a fingerprint scan, and wherein the implicit credential comprises sensor input selected or combined from the group consisting of a microphone, a biometric scanner, RFID reader and a camera.

3. The apparatus of claim 1, wherein the processor further transmits the authentication request to the authority, wherein determining whether the implicit credential matches the predefined credential comprises the authority verifying the implicit credential.

4. The apparatus of claim 1, wherein the authentication request includes a reset token selected or combined from the group consisting of a name, an identification number, a location, a mascot, and a cryptographic token, wherein the processor further resets the authentication token in response to verifying the reset token.

5. The apparatus of claim 1, wherein the processor further allows temporary access in response to the authentication request.

6. The apparatus of claim 5, wherein temporary access is limited to a threshold value, the threshold value selected from the group consisting of a threshold number of authentication requests and a threshold amount of time.

7. A method comprising:
receiving, by use of a processor and at an authenticating device, an authentication request from a user, the authentication request usable to authenticate the user, wherein the authentication request requires an authentication token to authorize the user's access of a computing resource;
determining, by the authenticating device, whether the authentication token is missing from the authentication request;
authenticating the user via the authentication request and the authentication token, in response to determining that the authentication token is not missing from the authentication request;
requesting an implicit credential in response to determining that the authentication token is missing from the authentication request, the user submitting the authentication request without any authentication token, the implicit credential being a different type of credential than the authentication token;
identifying a time of day and date when the authentication request was received and a network address of a device that transmitted the authentication request, wherein the network address is one of an IP address and a MAC address;
requesting an implicit credential in response to the user submitting the authentication request without any authentication token, the implicit credential being a different type of credential than the authentication token;

determining, by the authenticating device, whether the time of day and date when the authentication request was received matches a predetermined time range in response to determining that the authentication token is missing from the authentication request;

determining, by the authenticating device, whether the network address of the device that transmitted the authentication request matches a predefined network address in response to determining that the authentication token is missing from the authentication request;

determining, by the authenticating device, whether the implicit credential matches a predefined credential in response to determining that the authentication token is missing from the authentication request; and resetting, by the authenticating device, the authentication token in response to the time of day and date when the authentication request was received matching the predetermined time range, the network address of the device matching the predefined network address, and the implicit credential matching the predefined credential.

8. The method of claim 7, wherein the authentication token is one of a password and a fingerprint scan, and wherein the implicit credential comprises sensor input selected or combined from the group consisting of a microphone, a biometric scanner, RFID reader and a camera.

9. The method of claim 7, further comprising transmitting the authentication request to the authority, wherein determining whether the implicit credential matches the predefined credential comprises receiving a response from the authority.

10. The method of claim 7, further comprising allowing temporary access in response to the authentication request.

11. The method of claim 10, wherein the temporary access is limited to a threshold value, the threshold value selected from the group consisting of a threshold number of authentication requests and a threshold amount of time.

12. The method of claim 7, wherein the authentication request includes a reset token selected or combined from the group consisting of a name, an identification number, a location, a mascot, and a cryptographic token, the method further comprising: resetting the authentication token in response to verifying the reset token.

13. The method of claim 7, wherein before receiving the authentication request, the method further includes learning the implicit credential.

14. The method of claim 7, the method further includes learning the predetermined time range and the predefined network address from a prior authentication request having a valid authentication token.

15. A program product comprising a non-transitory computer readable storage medium that stores code executable by a processor to perform:

receiving an authentication request from a user, the authentication request usable to authenticate the user, wherein the authentication request requires an authentication token to authorize the user's access of a computing resource;

determining whether the authentication token is missing from the authentication request;

authenticating the user via the authentication request and the authentication token, in response to determining that the authentication token is not missing from the authentication request;

requesting an implicit credential in response to determining that the authentication token is missing from the authentication request, the implicit credential being a different type of credential than the authentication token;

identifying a time of day and date when the authentication request was received and a network address of a device that transmitted the authentication request, wherein the network address is one of an IP address and a MAC address;

requesting an implicit credential in response to determining that the authentication token is missing from the authentication request, the implicit credential being a different type of credential than the authentication token;

determining whether the time of day and date when the authentication request was received matches a predetermined time range in response to determining that the authentication request is missing the authentication token;

determining whether the network address of the device that transmitted the authentication request matches a predefined network address in response to determining that the authentication request is missing the authentication token;

determining whether the implicit credential matches a predefined credential in response to determining that the authentication request is missing the authentication token; and resetting the authentication token in response to the time of day and date when the authentication request was received matching the predetermined time range, the network address of the device matching the predefined network address, and the implicit credential matching the predefined credential.

16. The program product of claim 15, wherein the authentication token is one of a password and a fingerprint scan, and wherein the implicit credential comprises sensor input selected or combined from the group consisting of a microphone, a biometric scanner, RFID reader and a camera.

17. The program product of claim 15, wherein the authentication request includes a reset token selected or combined from the group consisting of an identifying name, an identification number, a location, and a cryptographic token, wherein the code further resets the authentication token in response to verifying the reset token.

18. The program product of claim 15, the code further allows temporary access in response to the authentication request.

19. The program product of claim 18, wherein the temporary access is limited to a threshold value, the threshold value selected from the group consisting of a threshold number of authentication requests and a threshold amount of time.

20. The program product of claim 15, wherein the code further transmits the authentication request to the authority, wherein determining whether the implicit credential matches the predefined credential comprises the authority verifying the implicit credential.

* * * * *